Patented June 5, 1945

2,377,654

UNITED STATES PATENT OFFICE 2,377,654

GEAR LUBRICANTS

Herschel G. Smith, Wallingford, Pa., assignor to Gulf Oil Corporation, Pittsburgh, Pa., a corporation of Pennsylvania No Drawing. Application November 27, 1941, Serial No. 420,738

1 Claim. (Cl. 252—41)

This invention relates to an improved gear lubricant, resistant to foaming under service conditions; said improved gear lubricant having little or no tendency to foam or froth when subjected to violent agitation in the presence of air or other gas.

In handling, preparing and processing mineral oils, such as petroleum oils, and mineral oil compositions, they are frequently subjected to violent agitation, in the presence of air or other gas, with the result that a foam or froth is produced. This difficulty is encountered, for example, in pumping such materials and also in agitating such materials for the purpose of incorporating other materials, such as the so-called "additive" agents, therein. It is troublesome and leads to various operating difficulties.

An even more serious instance in which foaming or frothing is encountered arises in lubricating rapidly moving machinery, for example in the lubrication of transmission gears, and the difficulty is especially serious in the case of modern hypoid gears and the like, such as are now commonly used in automotive transmissions. The tendency of such gears to produce foaming of the lubricant in which they are immersed is of course high, and the results of foaming are especially serious. The rubbing speeds and bearing pressures in such gears are extremely high and it is necessary to provide a lubricant film which thoroughly wets the metal surfaces and tenaciously adheres to them under such conditions. It is difficult to maintain proper lubrication when the lubricant tends to foam. The problem is aggravated by the fact that today it is highly desirable to employ heavy viscous liquid lubricants rather than greases for lubricating such gears, and by the fact that such lubricants commonly contain various "additive" agents, such as the so-called "extreme-pressure" or "E P" agents. Many of these agents tend to promote foaming. This not only interferes with lubrication but it also impairs the ability of the lubricant to act as a coolant for the gears. Additional difficulties may also result from foaming, such as an increased tendency toward leakage of the lubricant out of the geared case or box.

I have observed that nearly all petroleum oils, and particularly heavy oils, exhibit a marked tendency to foam when subjected to violent agitation as aforesaid. The amount of foam or froth depends in part upon the conditions of agitation, in part upon the characteristics of the oil or oil base itself, and in part upon the presence of additional agents or ingredients, such as the "additives" referred to above. In general, both the amount and the stability of the foam tend to increase with the viscosity of the oil; when heavy lubricating oils are subjected to violent agitation in the presence of air or other gas, they tend to foam strongly and the foam persists for a considerable time after the agitation has ceased.

Inasmuch as it is highly desirable to prevent such foaming, the primary objects of my invention are the provision of a method whereby such foaming or frothing may be suppressed, and the provision of mineral oil compositions, including gear lubricants and other lubricating compositions, which have little or no tendency to foam or froth.

I have discovered that the addition of a small quantity of potassium oleate to a mineral oil or a mineral oil composition will suppress or prevent foaming of the oil or oil composition when subjected to violent agitation, without disadvantageously changing the physical characteristics of the oil or oil composition, and without impairing its utility as a lubricant or otherwise.

Thus, I have found that the incorporation of a small amount of potassium oleate in a petroleum oil will suppress foaming when the oil is pumped or otherwise agitated, as for example when the oil is agitated for the purpose of incorporating an additive agent therein.

Furthermore, I have found that the addition of a small amount of potassium oleate to a heavy, viscous, mineral oil gear lubricant results in a superior composition, unimpaired with respect to its lubricating and pressure-resistant characteristics, but free or substantially free from undesirable foaming characteristics, and I have found that the addition of a small amount of potassium oleate to a gear lubricant containing mineral lubricating oil, and an extreme pressure agent, such as sulfurized sperm oil or the like, results in an improved gear lubricant having a substantially lower tendency to foam, without impairment of extreme pressure properties.

The amount of potassium oleate required in accordance with my invention will, of course, vary in accordance with the severity of the problem, that is to say the extent and degree of agitation to which the oil is likely to be subjected, as well as the tendency of the oil or oil composition itself to foam under the expected conditions. In general, from 0.2 to 0.8 per cent of potassium oleate on weight of the oil is sufficient, the preferred amount being ordinarily of the order of 0.5 per cent. However, in some cases, where the problem is especially drastic, as much as 1 per cent of potassium oleate may be required to suppress foaming.

Therefore, in order to suppress foaming of mineral oils, the indicated amount of potassium oleate is simply incorporated in the oil or oil composition, and maintained therein when the oil or oil composition is subjected to conditions which would otherwise cause severe foaming. This applies whether or not the oil is to be used as a lubricant. My invention, in its broadest aspects, is applicable to all mineral oils and mineral oil compositions which would otherwise have foaming characteristics, irrespective of whether the same are intended for use as lubricants.

However, as has been indicated above, my invention is particularly advantageous in application to gear lubricants, especially heavy viscous liquid petroleum oil composition, which may or may not contain (but preferably do contain) an extreme-pressure agent. Various extreme-pressure agents may be employed, but I have found that a particularly effective and satisfactory extreme-pressure agent, which works well with potassium oleate, is sulfurized sperm oil.

Thus, an improved gear lubricant, prepared in accordance with my invention, has the following composition:

|  | Percent by weight |
|---|---|
| Refined mineral lubricating oil | 89 to 94.8 |
| Refined sulfurized sperm oil | 5 to 10.0 |
| Potassium oleate | 0.2 to 1.0 |

Obviously, other ingredients may be included, if desired, although there is ordinarily no necessity for including them.

More specifically, a gear lubricant having especially advantageous properties, is illustrated in the following example:

*Example I.*—In this example an improved gear lubricant is prepared from a highly refined paraffinic oil having a viscosity of from 140 to 150 seconds S. U. V. at 210° F. The lubricant is prepared by adding sulfurized sperm oil and potassium oleate to this paraffinic oil, the final product having the following composition:

|  | Per cent by weight |
|---|---|
| Oil base | 92 |
| Refined sulfurized sperm oil | 7.50 |
| Potassium oleate | 0.50 |

As indicative of the fact that the presence of potassium oleate does not disadvantageously alter the physical properties of this composition, or interfere with its ability to withstand high film pressures, the following comparison is offered in which the characteristics and properties of my improved gear lubricant are compared with those of a similar lubricant, but containing no potassium oleate.

TABLE I

|  | A Improved gear lubricant | B Old gear lubricant |
|---|---|---|
| Mineral oil, percent by weight | 92.00 | 92.50 |
| Sulfurized sperm oil | 7.50 | 7.50 |
| Potassium oleate | 0.50 | 0.00 |
| Gravity, °API | 26.4 | 26.6 |
| Viscosity, SUV: |  |  |
| 100° F | 2,146 | 1,918 |
| 130° F | 776 | 767 |
| 210° F | 144.1 | 141.7 |
| Viscosity index | 101 | 107 |
| Flash, OC, °F | 470 | 470 |
| Fire, OC, °F | 565 | 555 |
| Pour, °F | +10 | +10 |
| Color, NPA | 4.75 | 4.75 |
| Sulfur (B), percent | 0.87 | 0.87 |
| Copper strip test, 122° F., 3 hr | Passes | Passes |
| Centrifuge test, separation percent 1,500 R. P. M., room temp., 2 hr | Trace | Trace |
| Carbon residue, percent | 0.86 | 0.49 |
| Neutralization No | 0.90 | 0.90 |
| Surface tension, 77° F., dynes. cm | 34.0 | 34.2 |
| Almen test: 600 R. P. M.—Lever load, pounds | 16 | 16 |
| Timken test: 800 R. P. M., 135° F., 10 min.—Lever load, pounds | 42 | 42 |

As will be shown hereinbelow, incorporation of potassium oleate in this composition markedly suppresses the foaming of the lubricant under service conditions.

In order to evaluate the foaming tendency of petroleum oils, the following test has been devised, it having been found that this test affords an accurate indication of the comparative foaming tendencies of mineral oils and mineral oil compositions. This test has been devised, in fact, to subject a given sample of oil to very drastic foaming conditions, under a standardized procedure which makes it possible not only to determine, in a more or less quantitative manner, the tendency of the oil to foam, but also the stability or permanency of the foam produced.

In general, it resembles a somewhat similar testing method employed by the General Motors Corporation for determining the foaming tendencies of gearing lubricants, but has been modified in the direction of greater accuracy and in order to make it possible to record more comprehensible test data.

FOAMING TEST

The device employed in this test is an adaptation of an ordinary commercial household mixer, more specifically a "Sunbeam Mixmaster," Model 1, manufactured by the Flexible Shaft Company, Chicago, Ill. The device employed in the test is identical with the usual household model with the exception of two slight changes made to better adapt it to the test procedure. First, the usual turntable of the usual household mixer is removed and replaced with a rigid platform. Second, a cylindrical brass container having an inside diameter of 7 inches and an inside height of 4 inches is substituted for the usual household glass mixing bowl. A predetermined quantity of oil, (500 cc.), is placed in the container, located on the platform, and the motor-driven agitator device is lowered into fixed position in the container.

The agitator device itself comprises a pair of motor driven beaters which are of the convex outside surface type described in U. S. Patent 2,161,881. As shown in that patent, each beater has a pair of blades of the type indicated, the beaters being so positioned with respect to each other that the two pairs of beater elements are at right angles to each other, and rotate in opposite directions in closely spaced, overlapping paths. For the purposes of the present test, the beaters are rotated at a speed of 550 R. P. M. controlled within ±10 R. P. M. In operating position, the beaters are perpendicular to the base of the mixer, as shown in Patent 2,161,881. In the present test they are centered in the container and the bottom of the beaters is spaced approximately ⅛ inch from the bottom of the pan when the latter is positioned on the rigid platform. In this position, with 500 cc. of oil in the container, the beaters are submerged in the initial oil sample only to a depth of ¾ of one inch.

The container is supplied with a graduated gauge, whereby measurements may be taken of the depth of oil or oil and foam, before and after agitation.

In testing an oil sample in accordance with this test, the sample is first brought to approximately room temperature, the measured sample of 500 cc. (±5 cc.) of oil is then introduced into the container, the temperature of the sample is brought to 77° F. and the container is then placed in position and the beater elements lowered into the operating position.

The motor is then started, being adjusted to operate at the speed indicated above, and thus causing the beaters to agitate the oil and beat air into the sample. This agitation is continued for exactly 15 minutes.

After agitating the oil for 15 minutes, the motor is stopped, the beaters are removed from the oil, and any oil or foam adhering to the beaters is permitted to drain into the container, a period of 1 minute ordinarily being sufficient for this purpose. The foam level is then immediately determined, and the temperature of the sample is measured. It is then possible to calculate the ratio of the volume of oil and foam to the volume of the original oil, the allowance being made for any temperature changes.

The container is then removed from the rigid platform, set in a quiet place and allowed to stand for one hour (measured from the time the stirring is stopped). The volume and temperature measurements are taken again, and serve to indicate stability or permanence of the foam produced.

Whenever desired, the test procedure may be varied, as for example by changing the size of the sample, the speed of agitation or the time of agitation, or by taking the final measurements at an earlier or later period. However, in the test referred to hereinbelow, the procedure was precisely as indicated hereinabove.

The following Table II shows the results of testing the two gear lubricants, the characteristics of which have been shown above in Table I. As noted, the figures in the first column under the heading "A," show the results of testing the improved gear lubricant shown in Example I above, while the figures in the second column show the results of testing an oil "B," identical with oil "A" except that no potassium oleate is present.

TABLE II

*Foam test*

| Gear lubricant | A | B |
|---|---|---|
| At end of stirring: | | |
| Volume of oil and foam, cc | 580 | 1,740 |
| Temperature, °F | 82 | 84 |
| Temperature rise | 5 | 7 |
| Increase in volume, cc | 80 | 1,240 |
| Ratio[1] | 1.16 | 3.48 |
| Nature of foam | Fine | Coarse |
| After 1 hr. standing: | | |
| Volume of oil and foam, cc | 540 | 660 |
| Temperature, °F | 77 | 77 |
| Increased volume, cc | 40 | 160 |
| Ratio[1] | 1.08 | 1.32 |

[1] Ratio of $\frac{\text{volume of oil and foam}}{\text{volume of original oil}}$ As is evident from the test results shown above, the improved lubricant of Example I shows a remarkable resistance to foaming, even when subjected to the drastic agitation conditions of this test. Moreover, the relatively small amount of foam which does form quickly subsides after the agitation has ceased, the foam being unstable and transient in character.

In preparing gear lubricants as shown above, it is advantageous to incorporate the potassium oleate in the mineral oil before incorporating the sulfurized sperm oil or other extreme pressure agent, as in this way the potassium oleate suppresses foaming during the compounding of the oil base with the extreme pressure agent. However, the potassium oleate and sulfurized sperm oil or other extreme pressure agent may be incorporated in the oil base at one and the same time if desired. So far as subsequent performance as a lubricant is concerned, the order of adding the potassium oleate and the extreme pressure agent is unimportant.

The use of potassium oleate in accordance with my invention, as a means of suppressing foam, is sharply to be distinguished from the use of such material, as well as other soaps, for other purposes in lubricants and other oils. As evidence of this, it may be observed that foaming tests conducted on oil compositions containing a number of other soaps, such as aluminum oleate, lead oleate, sodium oleate, sodium rosin soap, magnesium sperm oil soap, show that incorporation of such soaps other than potassium oleate did not suppress foaming, and in some cases caused an increase in the foaming tendency of the oils or oil compositions to which such materials were added. So far as I have been able to determine, potassium oleate is unique among metallic soaps and related materials with respect to its effectiveness as a foam suppressor.

While my invention has been described above with reference to various specific examples and embodiments, it will be understood that my invention is not limited to such illustrative examples and embodiments but may be variously practiced within the scope of the claims herein made. Thus, while I have referred to gear lubricants, it is to be understood that my invention in its broadest aspects is not so limited and may be applied to other lubricants, such as relatively light lubricants for hydraulic or fluid drives and for other purposes, even for oils as light as S. A. E. 10 grade. This invention may also be applied to cutting oil, and in fact to any oil where foaming represents a problem.

What I claim is:

An improved gear lubricant, resistant to foaming under service conditions, comprising a major amount of heavy mineral lubricating oil containing 5 to 10 per cent of sulfurized sperm oil and 0.2 to 1.0 per cent of potassium oleate dissolved therein, the amount of potassium oleate being sufficient to suppress foaming of the oil composition when agitated under service conditions.

HERSCHEL G. SMITH.